United States Patent
Wada et al.

(10) Patent No.: US 7,607,841 B2
(45) Date of Patent: *Oct. 27, 2009

(54) PICKUP DEVICE DRIVING APPARATUS, PHOTOGRAPHING DEVICE USING THE SAME, AND MONITORING CAMERA APPARATUS

(75) Inventors: Jouji Wada, Kanagawa (JP); Shokichi Takahashi, Tokyo (JP); Masaomi Iiizumi, Kanagawa (JP); Masafumi Mizuno, Kanagawa (JP)

(73) Assignee: Panasonic Corporation, Osaka (JP)

( * ) Notice: Subject to any disclaimer, the term of this patent is extended or adjusted under 35 U.S.C. 154(b) by 588 days.

This patent is subject to a terminal disclaimer.

(21) Appl. No.: 10/579,944

(22) PCT Filed: Nov. 16, 2005

(86) PCT No.: PCT/JP2005/020998

§ 371 (c)(1),
(2), (4) Date: May 22, 2006

(87) PCT Pub. No.: WO2006/054570

PCT Pub. Date: May 26, 2006

(65) Prior Publication Data

US 2007/0147193 A1   Jun. 28, 2007

(30) Foreign Application Priority Data

Nov. 17, 2004   (JP) ............................ 2004-333015

(51) Int. Cl.
*G03B 17/00* (2006.01)

(52) U.S. Cl. ...................................... 396/419; 396/421
(58) Field of Classification Search .................. 396/55, 396/419, 421, 427; 348/208.99, 208.4, 208.7, 348/208.11, 219.1, 373
See application file for complete search history.

(56) References Cited

U.S. PATENT DOCUMENTS 5,266,988 A   11/1993  Washisu (Continued)

FOREIGN PATENT DOCUMENTS

JP   2720955 B   11/1997

(Continued)

OTHER PUBLICATIONS

International Search Report corresponding to International Application No. PCT/JP05/020998 dated Feb. 21, 2006.

(Continued)

*Primary Examiner*—Rodney E Fuller
(74) *Attorney, Agent, or Firm*—RatnerPrestia

(57) ABSTRACT

A pickup device driving apparatus includes a base of which the position is fixed with respect to a lens part, a movable part, a pickup device which is attached to the movable part in a state that a pickup surface is perpendicular to an optical axial direction, a first support part and a second support part which support the movable part, a first rotating part, a second rotating part, a third rotating part, and a fourth rotating part, and a driving part for driving the pickup device such that the position of the pickup device is changed relative to the lens part in a state that rotating center axes form vertexes of a parallelogram.

12 Claims, 11 Drawing Sheets

U.S. PATENT DOCUMENTS

2003/0133013 A1 7/2003 Maeda et al.
2007/0002148 A1* 1/2007 Takahashi et al. ........ 348/219.1

FOREIGN PATENT DOCUMENTS

| JP | 10-268373 | | 10/1998 |
|----|-----------|---|---------|
| JP | 11-271631 | | 10/1999 |
| JP | 11-271631 | A | 10/1999 |
| JP | 2002-099019 | | 4/2002 |
| JP | 2002-099019 | A | 4/2002 |
| JP | 2003-209717 | | 7/2003 |
| JP | 2003-209717 | A | 7/2003 |
| JP | 2003-274229 | | 9/2003 |
| JP | 2003-274229 | A | 9/2003 |
| JP | 2004-226775 | | 8/2004 |
| JP | 2004-226775 | A | 8/2004 |

OTHER PUBLICATIONS

English translation of Search Report Form PCT/ISA/210.

* cited by examiner

FIG. 4A
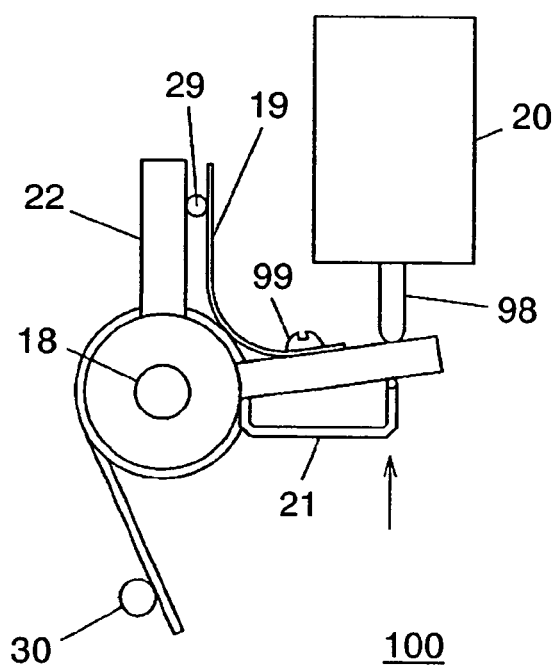
FIG. 4B
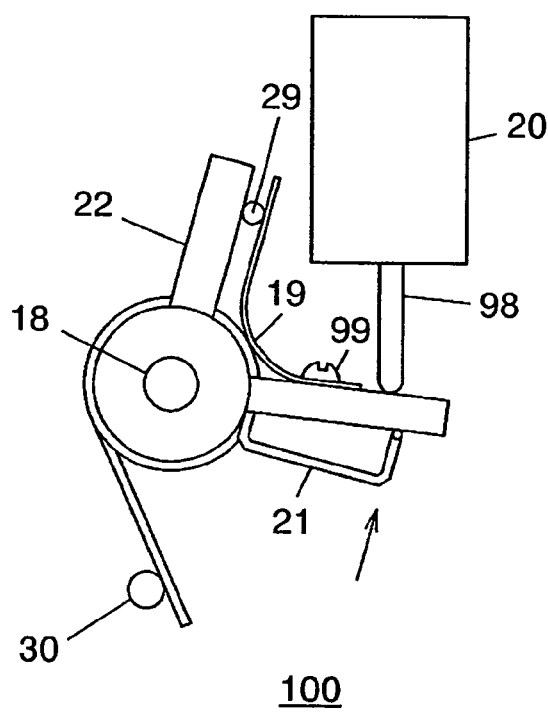
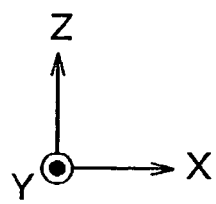
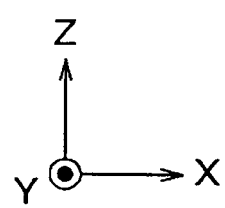

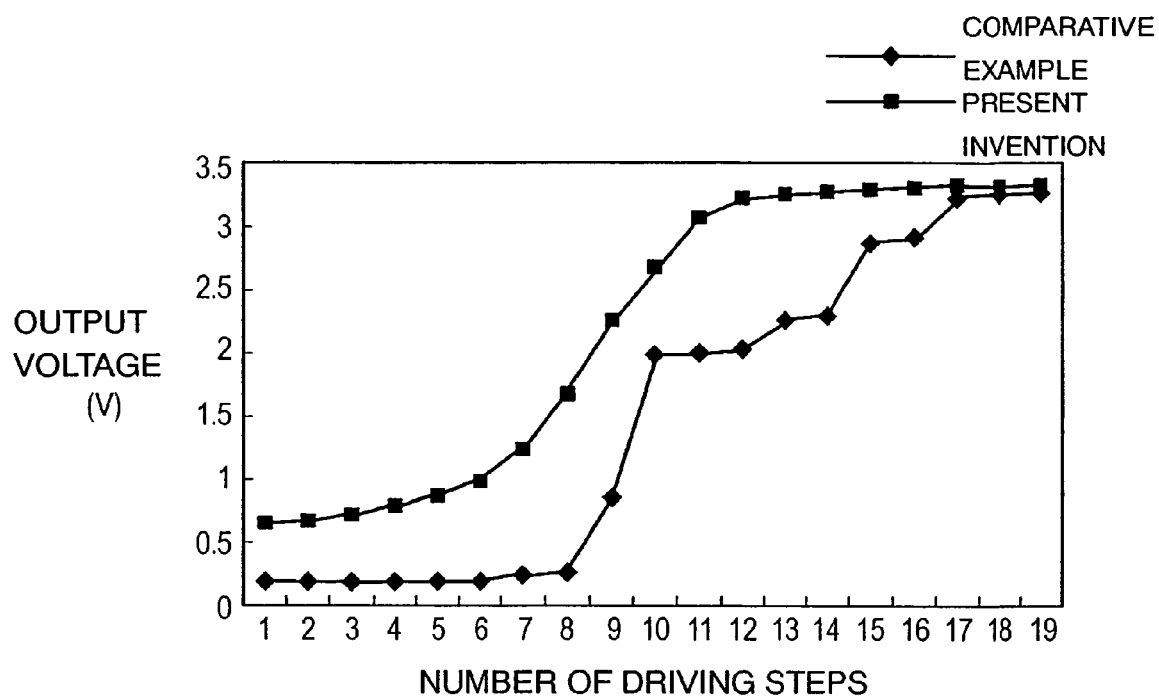
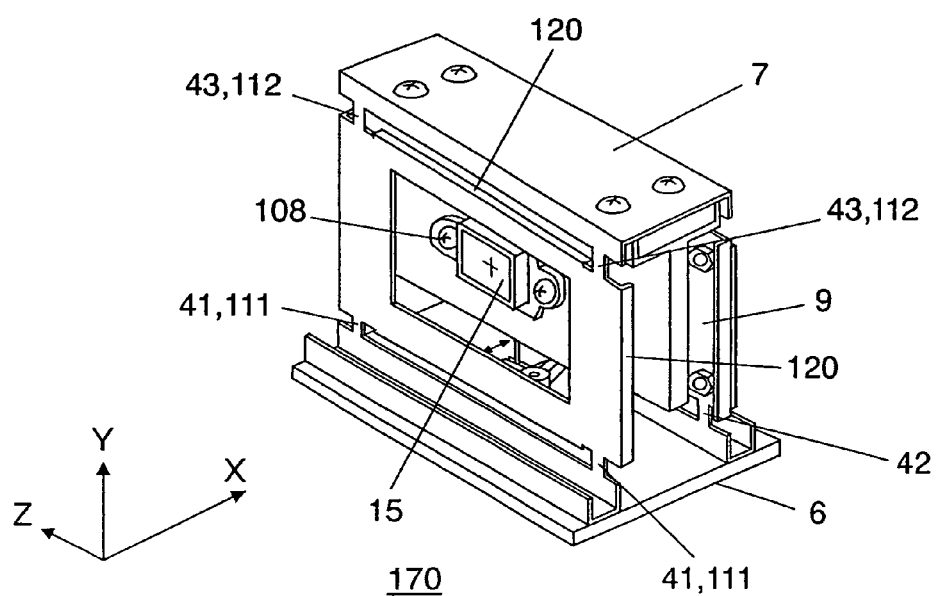

PICKUP DEVICE DRIVING APPARATUS, PHOTOGRAPHING DEVICE USING THE SAME, AND MONITORING CAMERA APPARATUS

THIS APPLICATION IS A U.S. NATIONAL PHASE APPLICATION OF PCT INTERNATIONAL APPLICATION NO. PCT/JP05/020998 DATED NOV. 16, 2005.

TECHNICAL FIELD

The present invention relates to a photographing apparatus such as a monitoring camera apparatus or a video camera apparatus, and more particularly, to a pickup device driving apparatus for moving a pickup device in an optical axial direction, a photographing apparatus using the same, and a monitoring camera apparatus.

BACKGROUND ART

First, a conventional photographing apparatus will be described. As an example of a photographing apparatus, a monitoring camera apparatus will be described.

Recently, a technology related to various monitoring camera apparatuses has been suggested. In particular, in a monitoring camera apparatus for performing a monitoring operation day and night, a technology of disposing an infrared-light cut filter for selectively transmitting visible light and absorbing infrared light on the front surface of a pickup device and performing photographing by day and removing the infrared-light cut filter disposed on the front surface of the pickup device and performing the photographing with the infrared light by night such that night photographing sensitivity increases and night monitoring precision is improved has been suggested.

In such a monitoring camera apparatus, when the photographing is performed using the visible light or when the photographing is performed using the infrared light, an optical path length varies depending on the existence of the infrared-light cut filter. Accordingly, if the optical path length is set to an optimal length upon the photographing using the visible light, a photographed image defocuses when the photographing using the visible light and the infrared light is performed by night.

In order to solve such a problem, for example, a monitoring camera apparatus for automatically moving an pickup device in an optical axial direction when mounting and removing an infrared-light cut filter and correcting a difference between optical path lengths upon photographing using visible light and infrared light to obtain a clear image day and night was suggested (for example, Japanese Patent Unexamined Publication No. 2003-274229).

In such a monitoring camera apparatus, a lead screw is used for moving the pickup device, and the pickup device is attached to a nut which is rotatably mounted to the lead screw such that the lead screw is rotated by rotating a stepping motor. By this configuration, since the lead screw is rotated by rotating the stepping motor, the pickup device can be moved by a desired distance in the optical axial direction.

However, in the above-described monitoring camera apparatus, the pickup device is moved by rotating the lead screw with respect to the fixed nut of the pickup device. To this end, mechanical movement may occur between the nut and the lead screw. In particular, even when the pickup device is slightly moved, linearity of the movement distance of the pickup device due to rotation of the lead screw deteriorates and thus driving precision is reduced.

DISCLOSURE OF THE INVENTION

An object of the present invention is to provide a pickup device having high driving precision even upon the slight movement, a photographing apparatus using the same, and a monitoring camera apparatus.

According to an aspect of the present invention, there is provided a pickup device driving apparatus including a base of which the position is fixed with respect to a lens part; a movable part which is provided to face the base; a pickup device which is attached to the movable part in a state that a pickup surface is perpendicular to an optical axial direction; a first support part and a second support part which are provided between the base and the movable part and support the movable part; a first rotating part which is provided between the base and the first support part; a second rotating part which is provided between the base and the second support part at a position which is moved from the first rotating part in the optical axial direction in parallel; a third rotating part which is provided between the movable part and the first support part; a fourth rotating part which is provided between the movable part and the second support part at a position which forms a vertex of a parallelogram with respect to the first rotating part, the second rotating part, and the third rotating part; and a driving part which changes the position of pickup device relative to the lens part, wherein rotating center axes of the first rotating part, the second rotating part, the third rotating part, and the fourth rotating part are perpendicular to the optical axial direction and parallel to one another, and wherein the position of the pickup device is changed relative to the lens part in a state that the first rotating part, the second rotating part, the third rotating part, and the fourth rotating part form vertexes of the parallelogram.

By this configuration, the movable part is held by four rotating parts of which rotating center axes are perpendicular to the optical axial direction and one side is provided at a vertex of a parallelogram parallel to the optical axial direction. Accordingly, since the pickup device can be moved in the optical axial direction of the lens part by a simple configuration that the pickup device is attached to the movable part in a state that the pickup surface is perpendicular to the optical axial direction, mechanical movement due to the use of a lead screw and a nut can be suppressed from being generated. Even upon slight movement, it is possible to realize a pickup device driving apparatus with high driving precision.

The first support part may be rotatably connected to the base by a first plural point and rotatably connected to the movable part by a second plural point, and the first plural point and the second plural point may form a plane, the second support part may be rotatably connected to the movable part and the base, the first rotating part may connect the base to the first support part at the first plural point, and the third rotating part may connect the movable part to the first support part at the second plural point.

By this configuration, since the first support part holds the base and the movable part by plural points and the plural points are held to be located on a plane, spatial distortion can be prevented from being generated when the position of the pickup device in the optical axial direction is changed and slope error (so-called plane burr) of the pickup surface can be prevented from being generated.

At least one of the first rotating part, the second rotating part, the third rotating part, and the fourth rotating part may be a leaf spring.

By this configuration, since mechanical movement or friction is not generated in the leaf spring of the rotating parts connected with the respective member, hysteresis can be suppressed from being generated. In addition, it is possible to realize a configuration with high driving precision.

The first rotating part, the second rotating part, the third rotating part, and the fourth rotating part may be the leaf springs.

By this configuration, since the rotating parts connected with the respective member are the leaf springs, mechanical movement or friction is not generated. Accordingly, hysteresis can be suppressed from being generated. In addition, it is possible to realize a configuration with higher driving precision.

The movable part, the first support part, the second support part, and the leaf spring may be integrally formed, and at least one of the movable part, the first support part, and the second support part may have a reinforcement part for increasing rigidity.

By this configuration, since the movable part, the first support part, the second support part, and the leaf spring are manufactured using an integral member, it is possible to realize a simple configuration. In addition, since at least one of the first support part and the second support part has the reinforcement part, it is possible to realize a configuration having necessary rigidity.

At least one of the first rotating part, the second rotating part, the third rotating part, and the fourth rotating part may be a hinge part.

By this configuration, since the mechanical strength of the hinge part in the rotating parts connected with the respective members can increase, it is possible to realize a configuration having excellent impact resistance.

The first rotating part, the second rotating part, the third rotating part, and the fourth rotating part may be hinge parts.

By this configuration, since the rotating parts connected with the respective members are the hinge parts, the mechanical strength can increase. Thus, it is possible to realize a configuration having more excellent impact resistance.

An elastic part may be provided between the first support part and the second support part.

By this configuration, it is possible to a configuration which can suppress mechanical movement at the hinge part from being generated.

A pressing part for pressing the movable part in a predetermined direction may be included, and the driving part may reduce a press force applied to the movable part by the pressing part to drive the movable part.

By this configuration, since the movable part is previously pressed in the predetermined direction, it is possible to realize a configuration which has excellent impact resistance and can more suppress hysteresis being generated.

According to another aspect of the present invention, there is provided a photographing apparatus including a lens part; the pickup device driving apparatus of the present invention; and an image signal processing part which performs an image signal process on a signal output from the pickup device of the pickup device driving apparatus.

By this configuration, the movable part is held by four rotating parts of which rotating center axes are perpendicular to the optical axial direction and one side is provided at a vertex of a parallelogram parallel to the optical axial direction. Accordingly, since the pickup device can be moved in the optical axial direction of the lens part by a simple configuration that the pickup device is attached to the movable part in a state that the pickup surface is perpendicular to the optical axial direction, mechanical movement due to the use of a lead screw and a nut can be suppressed from being generated. Even upon slight movement, it is possible to realize a photographing apparatus including a pickup device driving apparatus with high driving precision such that clear image photographing can be performed.

A displacement amount calculating part which calculates a displacement amount of the pickup device in a direction perpendicular to the optical axial direction; and a correcting part which corrects an image signal processed by the image signal processing part, based on the displacement amount of the pickup device in the direction perpendicular to the optical axial direction calculated by the displacement amount calculating part may be included.

By this configuration, it is possible to realize a photographing apparatus which is capable of correcting movement of the pickup device in a direction perpendicular to the optical axial direction by mounting the pickup device driving apparatus of the present invention.

According to another aspect of the present invention, there is provided a monitoring camera apparatus including a lens part; the pickup device driving apparatus of the present invention; an illumination-intensity change detecting part which detects change in illumination intensity; a filter part which attaches and detaches an infrared-light cut filter on an optical axis of the lens part depending on the change in illumination intensity detected by the illumination-intensity detecting part; and a control part which drives the driving part of the pickup device driving apparatus when the infrared-light cut filter of the filter part is attached and detached.

By this configuration, since the pickup device can be moved in the optical axial direction of the lens part by a simple configuration that the pickup device is attached to the movable part in a state that the pickup surface is perpendicular to the optical axial direction, mechanical movement due to the use of a lead screw and a nut can be suppressed from being generated. Even upon slight movement, it is possible to realize a monitoring camera apparatus including a pickup device driving apparatus with high driving precision such that photographing can be performed regardless of brightness of an environment.

As described above, it is possible to provide a pickup device driving apparatus having high driving precision even upon slight movement, a photographing apparatus using the same, and a monitoring camera apparatus.

BRIEF DESCRIPTION OF THE DRAWINGS

FIG. 4A is a plan view showing a configuration of a driving part of the pickup device driving apparatus according to the embodiment of the present invention;

FIG. 4B shows a state of the driving part of the pickup device driving apparatus according to the embodiment of the present invention, when a press force of the linear actuator increase;

FIG. 6 shows linearity characteristics of the pickup device driving apparatus according to the embodiment of the present invention and linearity characteristics of a comparative example;

FIG. 7 is a perspective view showing a configuration of a pickup device driving apparatus according to another embodiment of the present invention;

REFERENCE NUMERALS

Figure 1:
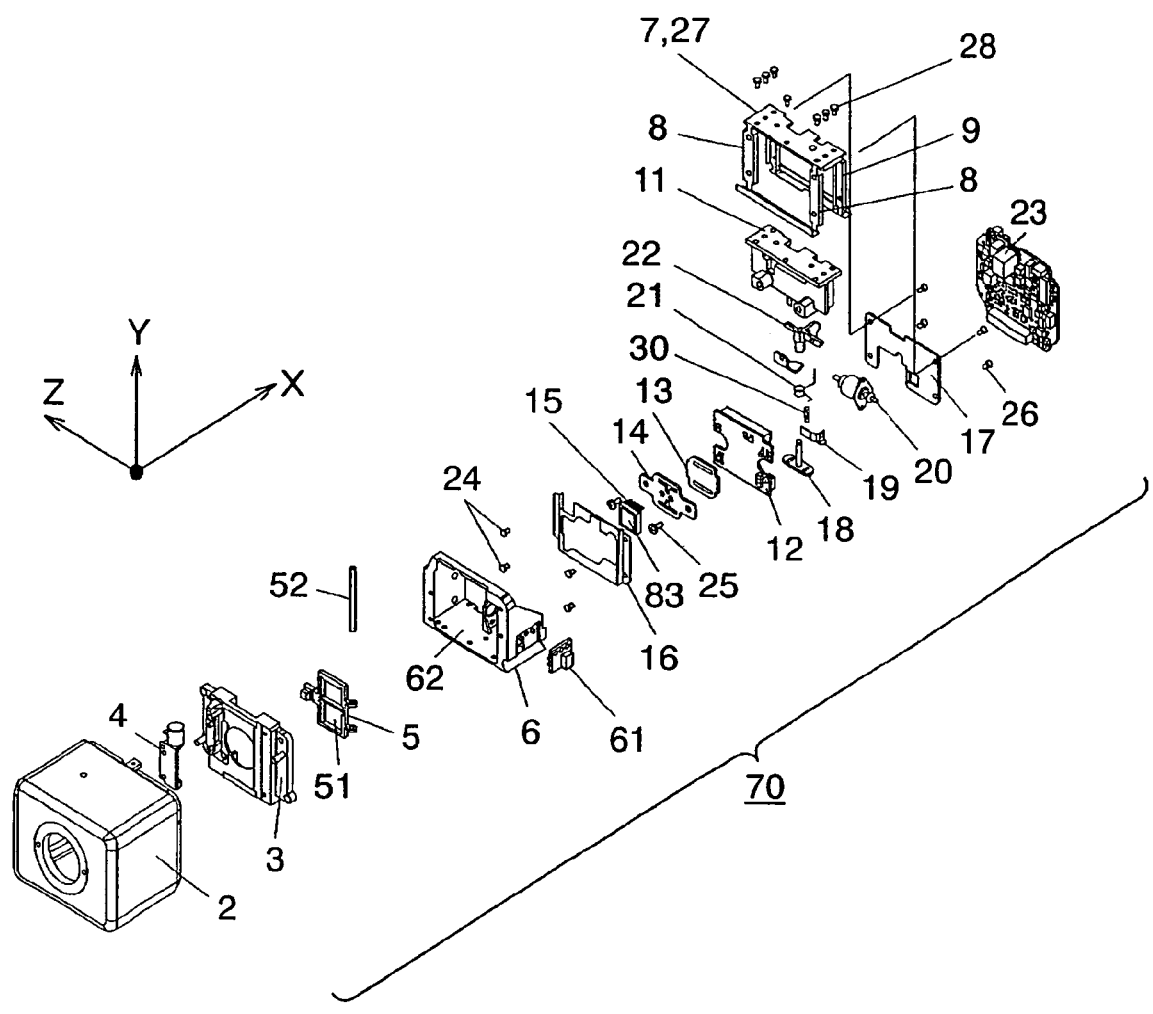
FIG. 1 shows a configuration of a photographing apparatus according to an embodiment of the present invention.

1: pickup device
2: lens mounting part
3: base attaching part
4: DC motor part
5: filter part
6: base
7: movable part
8, 108: first support part
9: second support part
10: leaf spring
11: pickup device holding part
12: pickup device circuit part
13: insulating sheet
14: heat sink
15: pickup device
16: first reinforcement plate
17: second reinforcement plate
18: bearing part
19: leaf spring
20: linear actuator
21: coil spring
22: driving direction changing part
23: circuit part
24, 25, 26, 28, 71, 72, 99: screw
27: reinforcement plate
29: pin
30: spring fixing part
41, 75a: first rotating part
42, 75b: second rotating part
43, 75c: third rotating part
44, 75d: fourth rotating part
51: infrared-light cut filter
52: filter driving part
61: position detecting part
62: base surface
70, 90, 93, 95, 170, 270, 370, 470: pickup device driving apparatus
74, 75, 76, 120, 130: bent part
76a: first rotating center axis
76b: second rotating center axis
76c: third rotating center axis
76d: fourth rotating center axis
80: U-shaped member
81: actuator holding part
82, 85: attachment surface
83: pickup surface
91: hinge part
96: elastic part
98: axis
100: driving part
101: lens part
111: first plural point
112: second plural point
140, 150: squeezed part

BEST MODE FOR CARRYING OUT THE INVENTION

Hereinafter, embodiments of the present invention will be described in detail with reference to the attached drawings.

EMBODIMENT

Figure 2:
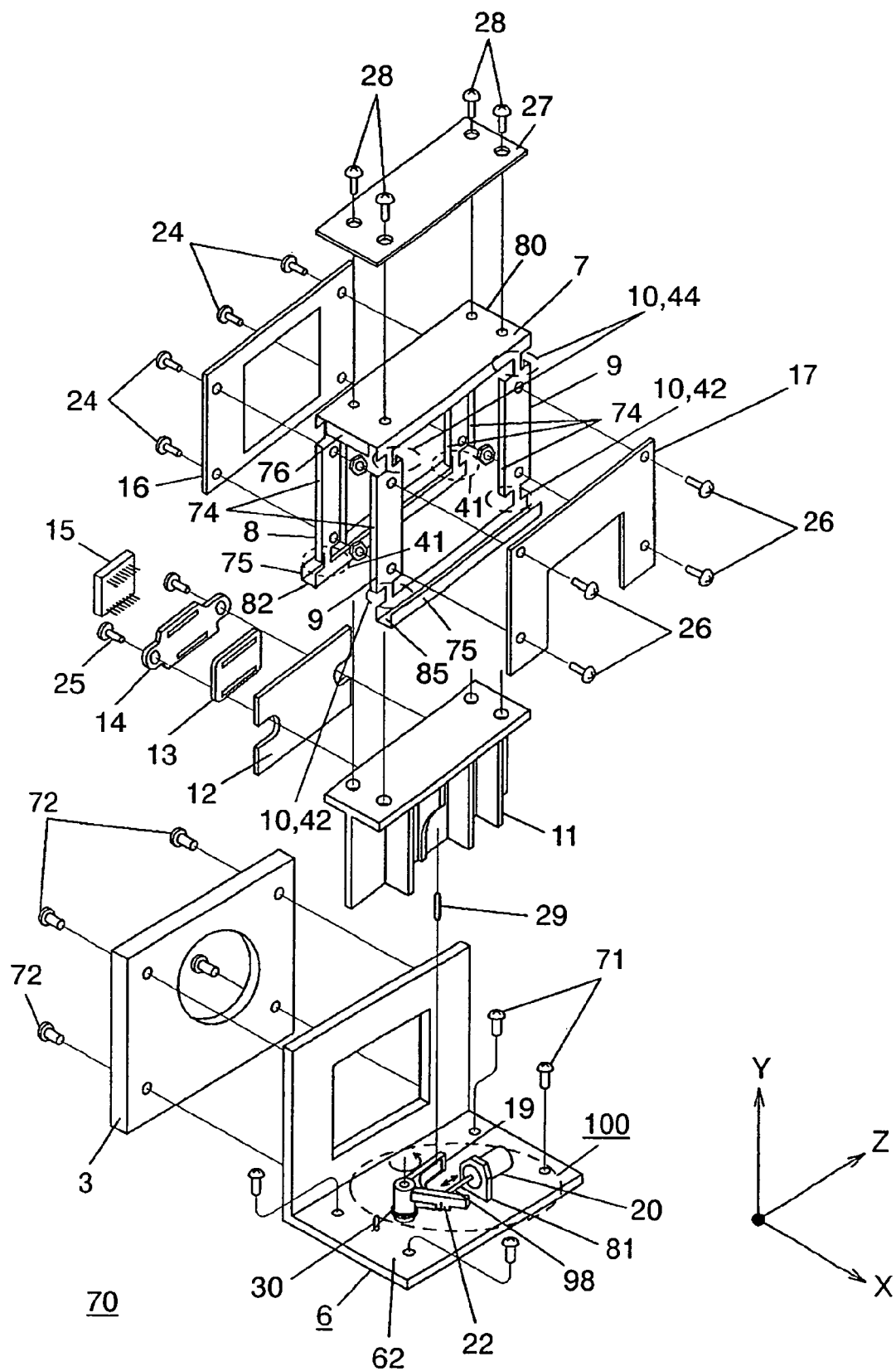
FIG. 2 is an exploded perspective view showing a configuration of a pickup device driving apparatus according to an embodiment of the present invention.

First, a configuration of photographing apparatus 1 according to an embodiment of the present invention will be described. FIG. 1 shows a configuration of photographing apparatus 1 according to the embodiment of the present invention. FIG. 2 is an exploded perspective view showing a configuration of pickup device driving apparatus 70 according to an embodiment of the present invention. For simplification of description, an X axis direction, a Y axis direction, and a Z axis direction perpendicular to one another are shown in the drawings. The X axis direction is an optical axial direction of a lens part, and the Y axis and Z axis direction are perpendicular to the optical axis direction.

As shown in FIGS. 1 and 2, photographing apparatus 1 according to the embodiment of the present invention includes lens mounting part 2 attached with lens part 101 (not shown in FIGS. 1 and 2), base attaching part 3 for connecting below-described base 6 to lens mounting part 2, DC motor part 4 which is disposed on base attaching part 3 and moves below-described filter part 5 in a direction (Y axis direction) perpendicular to the optical axis direction, filter driving axis 52 which is attached to DC motor part 4 and can be moved in the Y axis direction by driving DC motor part 4, filter part 5 which is attached to the filter driving axis 52, can be moved in the Y axis direction together with filter driving part 52 and has infrared-light cut filter 51, base 6 attached with base attaching part 3 and below-described U-shaped member 80 such that the position thereof is fixed with respect to lens part 101, position detecting part 61 which is attached to base 6 and detects the position of pickup device holding part 11, movable part 7 which is attached to the upper surface (hereinafter, referred to as base surface 62) of base 6 by first support part 8 and second support part 9 and faces base surface 62, a reinforcement plate 27 for reinforcing the strength of the movable part 7, leaf springs 10 mounted between movable part 7 and first support part 8, between movable part 7 and second support part 9, between base surface 62 and first support part 8, and between base surface 62 and second support part 9 in order to move movable part 7 on base surface 62 in the optical axis direction (X axis direction), first reinforcement plate 16 which is attached to first support part 8 by screw 24 and reinforces the mechanical strength of first support part 8, second reinforcement plate 17 which is attached to second support part 9 by screw 26 and reinforces the mechanical strength of second support part 9, pickup device holding part 11 which is attached to movable part 7 through reinforcement plate 27 by screw 28, heat sink 14 threadably fixed to pickup device holding part 11 through insulating sheet 13 and pickup device circuit part 12 by screw 25, pickup device 15 (known pickup device such as CCD or CMOS sensor) attached to pickup device circuit part 12 through heat sink 14 and insulating sheet 13, linear actuator 20 for driving pickup device holding part 11 in the optical axial direction (X axis direction) by the below-described method, bearing part 18 attached to base surface 62, driving direction changing part 22 which is pressed by linear actuator 20 and rotates on bearing part 18 to change a press direction of linear actuator 20, pin 29 provided on a surface facing base surface 62 of pickup device holding part 11, leaf spring 19 which is attached to driving direction changing part 22 and slidably holds pin 29 while inserting pin 29 between driving direction changing part 22 and leaf spring 19, coil spring 21 which is a pressing part for holding driving direction changing part 22 pressed in a direction, a spring fixing part 30 for fixing coil spring 21, and circuit part 23 including an image signal processing part for performing an image signal process on an electrical signal output from pickup device 15, a control part for performing a switch control process of filter 5, and a correcting part for performing the below-described correcting process.

Photographing apparatus 1 according to the embodiment of the present invention is a monitoring camera apparatus which performs photographing while switching filter part 5 according to brightness of an environment day and night. In other words, in a bright environment, infrared-light cut filter 51 is disposed on the optical axis and color image photographing is performed in a visible light region, and in a dark environment, infrared-light cut filter 51 disposed on the optical axis is removed and monochromic image photographing is performed by light beam of a wavelength including light beam in an infrared light region. In photographing device 1, the brightness of the environment can be detected by comparing illumination intensity detected by illumination-intensity change detecting part (not shown) mounted in circuit part 23 with a predetermined threshold value. When the illumination intensity detected by the illumination-intensity change detecting part exceeds the threshold value, it is determined that transition from daytime to nighttime occurs. Thus, circuit part 23 switches filter 5. In addition, the switch of filter part 5 can be performed by DC motor part 4 attached to base attaching part 3.

In photographing apparatus 1 according to the embodiment of the present invention, the switch of filter part 5 is performed when the illumination intensity is changed. At this time, since infrared-light cut filter 51 is disposed or detached (hereinafter, referred to as attached/detached) on the optical axis, the optical path length is changed and thus an optimal focusing position from lens part 101 to surface (hereinafter, referred to as pickup surface 83) on which a photoelectric converting element is disposed in pickup device 15 is changed. In order to correct change in optical path length, in photographing device 1 according to the embodiment of the present invention, pickup device driving apparatus 70 for moving pickup device 15 in the optical axial direction (X axis direction) in a state that pickup surface 83 is held in a direction perpendicular to the optical axial direction of lens part 101 (that is, a state that pickup device 15 is located in a plane parallel to a YZ plane in FIG. 1) by the control of the control part is mounted.

In photographing device 1 according to the embodiment of the present invention, as described below, leaf spring 10 between base 6 and first support part 8 functions as first bearing part 41, leaf spring 10 between base 6 and second support part 9 functions as second bearing part 42, leaf spring 10 between movable part 7 and first support part 8 functions as third bearing part 43, and leaf spring 10 between movable part 7 and second support part 9 functions as fourth bearing part 44.

Figure 3A:
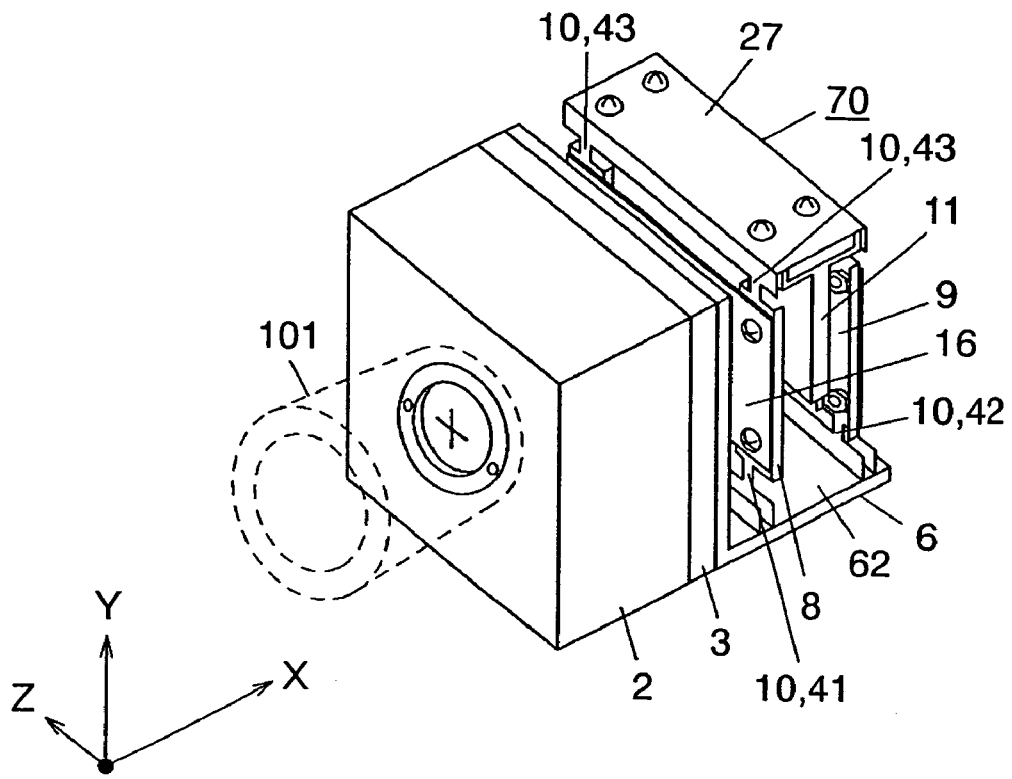
FIG. 3A shows the pickup device driving apparatus according to the embodiment of the present invention, when viewed at a side of a lens part.
Figure 3B:
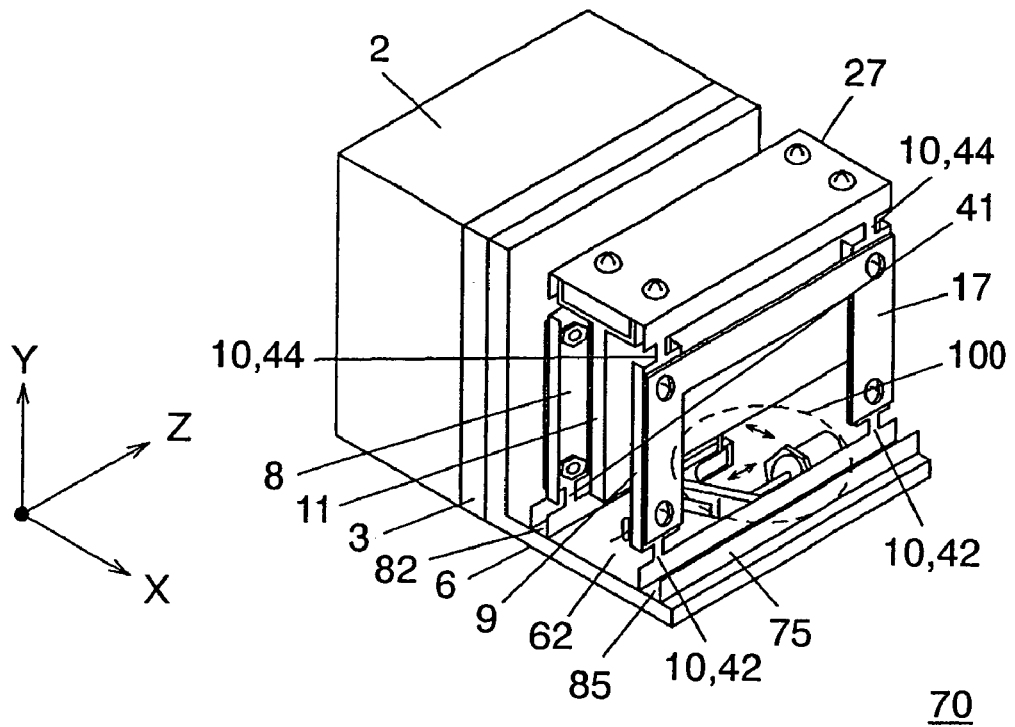
FIG. 3B shows the pickup device driving apparatus according to the embodiment of the present invention, when viewed at a side of a linear actuator.

Now, a configuration of pickup device driving apparatus 70 mounted on photographing device 1 according to the embodiment of the present invention will be described. FIGS. 3A to 3B are perspective views of pickup device driving apparatus 70. FIG. 3A shows pickup device driving apparatus 70 when viewed at the side of lens part 101 and FIG. 3B shows pickup device driving apparatus 70 when viewed at the side of linear actuator 20. In FIGS. 2, 3A, and 3B, for simplification of description, the structure is more simplified than that shown in FIG. 1.

As shown in FIGS. 2, 3A, and 3B, pickup device driving apparatus 70 according to the embodiment of the present invention includes base attaching part 3 attached to lens mounting part 2 such that the position thereof is fixed with respect to lens part 101, base 6 attached to base attaching part 3 by screw 72, first support part 8 and second support part 9 which are mounted on base surface 62 of base 6 in parallel and have the same height in the Y axis direction, rectangular movable part 7 which is attached parallel to base surface 62 in a state that first support part 8 and second support part 9 are placed parallel to each other, leaf springs 10 between movable part 7 and first support part 8, between movable part 7 and second support part 9, between base 6 and first support part 8, and between base 6 and second support part 9, reinforcement plate 27 attached to the upper surface of movable part 7 by screw 28, first reinforcement plate 16 which is attached to first support part 8 by screw 24 and reinforces mechanical rigidity of first support part 8, second reinforcement plate 17 which is attached to second support part 9 by screw 26 and reinforces mechanical rigidity of second support part 9, pickup device holding part 11 which is attached to the surface (rear surface) opposite to the surface (front surface) on which reinforcement plate 27 of movable part 7 is mounted by screw 28 and attached with pickup device circuit part 12 having pickup device 15 by screw 25, pin 29 provided on the lower surface facing base surface 62 of pickup device holding part 11, actuator holding part 81 mounted on base surface 62, linear actuator 20 held by actuator holding part 81, driving direction changing part 22 which is pivotably supported by bearing part 18 (not shown) mounted on base surface 62 to be rotated in the Y axis direction, leaf spring 19 which is mounted in driving direction changing part 22 and slidably moved while inserting pin 29 between driving direction changing part 22 and leaf spring 19, coil spring 21 which provides an elastic force in the opposite direction of a press force applied from linear actuator 20 to driving direction changing part 22, and spring fixing part 30 for holding coil spring 21.

As shown in FIG. 2, 3A, or 3B, in pickup device driving apparatus 70 according to the embodiment of the present invention, movable part 7, first support part 8, second support part 9, and leaf springs 10 are formed by U-shaped integral member 80 which is subjected to a bending process in a U shape. As a material of U-shaped member 80, a material having relative low rigidity such as a SUS material having a thickness of 0.12 mm can be used.

Base attaching part 3, base 6, and pickup device holding part 11 may be prepared by die casting using aluminum.

As a material of reinforcement plate 27, first reinforcement plate 16, and second reinforcement plate 17, a material having relative high rigidity such as a SUS material having a thickness of 0.5 mm can be used in order to reinforce the mechanical strength of U-shaped member 80.

In pickup device driving apparatus 70 according to the embodiment of the present invention, first support part 8, second support part 9, movable part 7, and leaf springs 10 are formed by U-shaped integral member 80. First reinforcement plate 16 and second reinforcement 17 are attached to portions of first support part 8 and second support part 9, respectively. Bent parts 74 are provided at the sides of first support part 8 and second support part 9. Thus, rigidity of first support part 8 and second support part 9 is higher than that of leaf springs 10.

Bent parts 76 are also provided at portions of movable part 7 of U-shaped member 80, and reinforcement plate 27 is attached to movable part 7. Thus, rigidity of movable part 7 is higher than that of leaf springs 10.

Bent parts 75 are provided at the ends of attachment surfaces 82 and 85 to be attached to base surface 62 of U-shaped member 80. Thus, rigidity of this portion can increase.

Since portions between movable part 7 of U-shaped member 80 and first support part 8 and second support part 9 are not subjected to a reinforcement process such as a bending process and have widths narrower than those of the other portions, these portions function as leaf springs 10.

Similarly, since portions between attachment surfaces 82 and 85 of U-shaped member 80 and first support part 8 and second support part 9 are not subjected to a reinforcement process such as a bending process and have widths narrower than those of the other portions, these portions also function as leaf springs 10.

In pickup device driving apparatus 70 according to the embodiment of the present invention, attachment surface 82 in which first support part 8 is in contact with base surface 62 and attachment surface 85 in which second support part 9 is in contact with base surface 62 are attached to base surface 62 by screw 71 to be parallel to the Z axis direction perpendicular to the optical axial direction (X axis direction).

Now, a configuration of driving part 100 of pickup device driving apparatus 70 according to the embodiment of the present invention will be described in detail.

FIGS. 4A to 4B are plan views showing the configuration of driving part 100 of pickup device driving apparatus 70 according to the embodiment of the present invention. FIG. 4A is a plan view showing the configuration of driving part 100 of pickup device driving apparatus 70 according to the embodiment of the present invention.

As shown in FIG. 4A, in pickup device driving apparatus 70 according to the embodiment of the present invention, linear actuator 20 presses driving direction changing part 22 in a vertical direction (−Z axis direction) of the drawing by axis 98 which can be moved in a vertical direction (Z axis direction) of the drawing. Coil spring 21 for applying an elastic press force in the opposite direction of the press force of linear actuator 20 is mounted on driving direction changing part 22. One end of coil spring 21 is fixed by spring fixing part 30. In a state shown in FIG. 4A, the press force of linear actuator 20 and the press force of coil spring 21 are in balance and driving direction changing part 22 is in a stop state. In addition, leaf spring 19 is attached to driving direction changing part 22 by screw 99 such that pin 29 of pickup device holding part 11 is inserted between driving direction changing part 22 and leaf spring 19. Pin 29 is driven between driving direction changing part 22 and leaf spring 19 by changing the press force of linear actuator 20.

FIG. 4B shows a state of driving part 100 when the press force of linear actuator 20 increases, in pickup device driving apparatus 70 according to the embodiment of the present invention.

As shown in FIG. 4B, when the press force of linear actuator 20 increases in a state shown in FIG. 4A, that is, when axis 98 extends in a lower direction (−Z axis direction) of the drawing, axis 98 presses driving direction changing part 22 and driving direction changing part 22 rotates on bearing part 18 in a clockwise direction. Thus, pin 29 is moved in a right direction (X axis direction) of the drawing.

Accordingly, in pickup device driving apparatus 70 according to the embodiment of the present invention, since driving direction changing part 22 for changing an output direction of linear actuator 20 is included in driving part 100, linear actuator 20 need not be the optical axial direction (X axis direction). Accordingly, linear actuator 20 may be arranged in a direction (Z axis direction) perpendicular to the optical axial direction and thus miniaturization of the apparatus can be realized. When the miniaturization is not required, pin 29 may be directly pressed and moved by linear actuator 20 without using driving direction changing part 22.

Now, an operation of pickup device driving apparatus 70 according to the embodiment of the present invention will be described in detail with reference to FIGS. 5A to 5B.

Figure 5A:
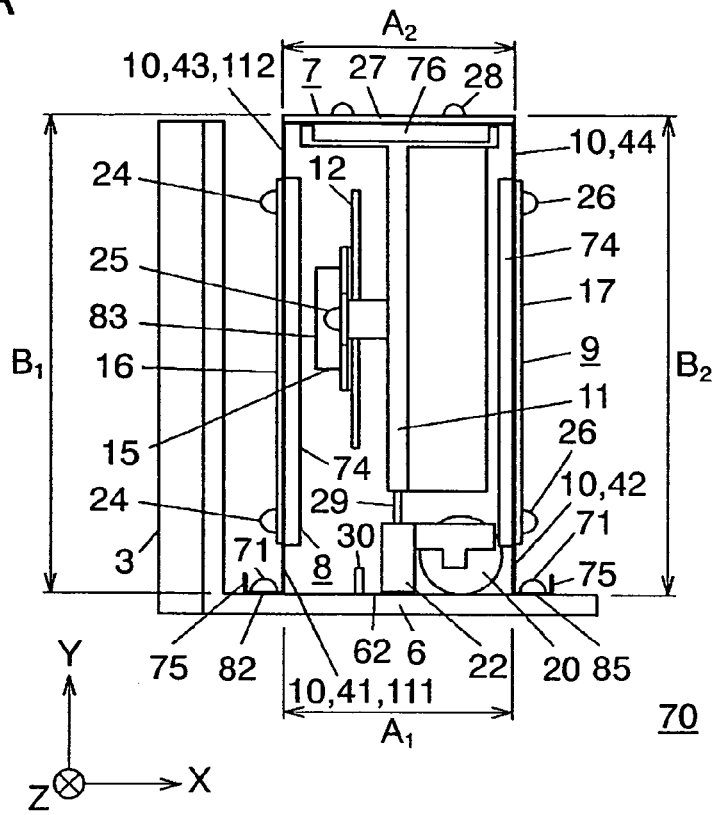
FIG. 5A is a side view showing an example of an operation of the pickup device driving apparatus according to the embodiment of the present invention.
Figure 5B:
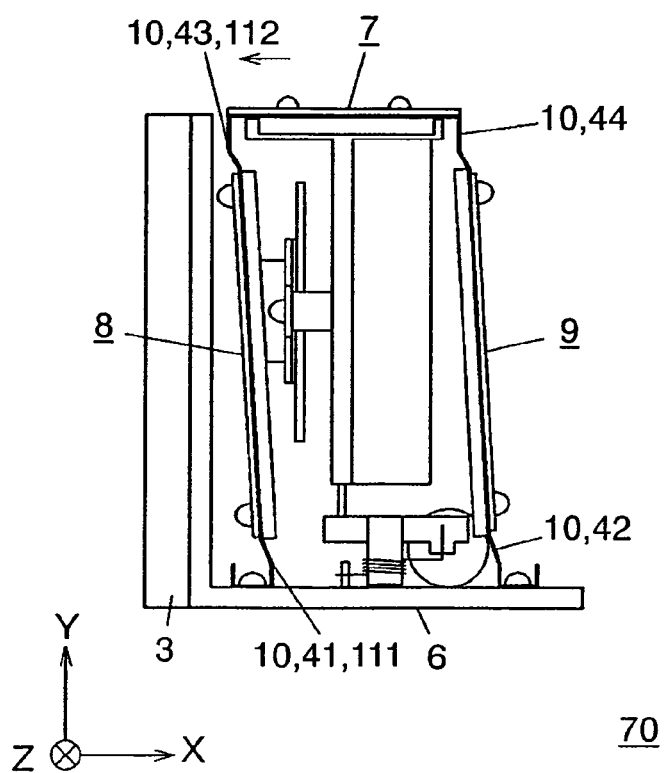
FIG. 5B is a side view showing an example of a state when the position of the pickup device of the pickup device driving apparatus according to the embodiment of the present invention is changed.

FIG. 5A is a side view showing an example of an operation of pickup device driving apparatus 70 according to the embodiment of the present invention, and FIG. 5B is a side view showing an example of a state when the position of pickup device 15 is changed.

In FIG. 5A, first support part 8 and second support part 9 of pickup device driving apparatus 70 are perpendicular to base surface 62. Distance $A_1$ between first support part 8 and second support part 9 on base surface 62 is equal to distance $A_2$ between first support part 8 and second support part 9 at a connection portion with movable part 7 in the optical axial direction (X axis direction). Since height $B_1$ from base surface 62 of first support part 8 to movable part 7 is equal to height $B_2$ from base surface 62 of second support part 9 to movable part 7, movable part 7 is held parallel to base surface 62. Since base surface 62 is placed parallel to the optical axial direction (X axis direction) of lens part 101, movable part 7 is also parallel to the optical axial direction of lens part 101.

In pickup device driving apparatus 70 according to the embodiment of the present invention, pickup device holding part 11 including pickup device circuit part 12 having pickup device 15 is disposed on the lower surface of movable part 7. At this time, by attaching pickup surface 83 of pickup device 15 to pickup device holding part 11 to be perpendicular to the surface of movable part 7 of pickup device holding part 11, the pickup surface 83 of pickup device 15 is held perpendicular to the optical axial direction.

In a state shown in FIG. 5A, a force that the axis of linear actuator 20 presses driving direction changing part 22 and a force that coil spring 21 presses driving direction changing part 22 in the opposite direction thereof by the elastic force are in balance and pin 29 provided on driving direction changing part 22 is in a stop state, as described in FIG. 4A. From this state, linear actuator 20 is operated to reduce a press force applied to driving direction changing part 22. Then, the force that the coil spring 21 presses driving direction changing part 22 becomes larger than the press force that linear actuator 20 presses driving direction changing part 22, driving direction changing part 22 rotates on bearing part 18, and pin 29 provided on the front end thereof is moved to the left side of FIG. 5A. By this movement, pickup device holding part 11 is moved in a left direction (−X axis direction) of the drawing, as shown in FIG. 5B. Since pickup device holding part 11 is moved in the left direction of the drawing, leaf springs 10 provided between movable part 7 and first support part 8, between movable 7 and second support part 9, between base surface 62 and first support part 8, and between base surface 62 and second support part 9 are elastically deformed. Accordingly, in pickup device driving apparatus 70 according to the embodiment of the present invention, first support part 8 and second support part 9 rotate on leaf springs 10, that is, rotate in directions perpendicular to the optical axial direction and parallel to each other (Z axis direction in FIG. 5B). Thus, first support part 8 and second support part 9 rotate with respect to base 6 and movable part 7.

In other words, when pickup device 15 is moved from a state of FIG. 5A to a state of FIG. 5B, since height $B_1$ of first support part 8 and height $B_2$ of second support part 9 are equal to each other and distance $A_2$ between first support part 8 and second support part 9 at the connection portion with movable part 7 and distance $A_1$ between first support part 8 and second support part 9 on base surface 62 are equal to each other as described above, movable part 7, first support part 8, second support part 9, and base surface 62 are deformed to form a substantial parallelogram. Accordingly, in pickup device driving apparatus 70 according to the embodiment of the present invention, the position of pickup device 15 can be moved in the optical axial direction while movable part 7 is held parallel to base surface 62. At this time, pickup device 15 is moved in a state that pickup surface 83 of pickup device 15 placed perpendicular to movable part 7 is held perpendicular to the optical axial direction. In other words, in a state that rotating center axes of first rotating part 41, second rotating part 42, third rotating part 43, and fourth rotating part 44 form vertexes of the substantial parallelogram, movable part 7 is moved on base 6, and pickup device 15 can be moved in the optical axial direction in a state that the plane direction of pickup surface 83 is held.

In pickup device driving apparatus 70 according to the embodiment of the present invention, contrary to the above, in order to move pickup device 15 to be apart from lens part 101, by increasing the press force of linear actuator 20, the press force applied to driving direction changing part 11 becomes stronger. Then, as shown in FIG. 4B, the press force that coil spring 21 presses driving direction changing part 22 becomes larger than the press force that linear actuator 20 presses driving direction changing part 22, driving direction changing part 22 rotates on bearing part 18 in a direction (clockwise direction) opposite to the above, and pin 29 provided on the front end thereof is moved to the right side of FIG. 5A. Pickup device holding part 11 is moved in the right direction (X axis direction) by movement of pin 29.

In pickup device driving apparatus 70 according to the embodiment of the present invention, since movable part 7 is supported by first support part 8 and second support part 9 which have the same height from base surface 62, are parallel to each other, and rotate in the optical axial direction, movable 7 can be moved in the optical axial direction while being always held parallel to base surface 62. Since pickup device holding part 11 is attached such that pickup surface 83 of pickup device 15 is disposed in the direction perpendicular the movable part 7, pickup device 15 can be moved in the optical axial direction while pickup surface 83 thereof is held perpendicular to the optical axial direction and pickup device 15 can be moved with high precision.

In the above-described configuration, first support part 8 and base part 6 are held by a pair of first rotating parts 41 (also referred to as first plural point 111) and first support part 8 and movable part 7 are held by a pair of third rotating parts 43 (also referred to as second plural point 112). In other words, first rotating part 41 rotatably connects first support part 8 to base 6 at first plural point 111 and third rotating part 43 rotatably connects first support part 8 to movable part 7 at second plural point 112. First support part 8 can hold first plural point 111 and second plural point 112 on a plane while pickup device 15 is moved. Accordingly, according to pickup device driving apparatus 70, spatial distortion can be prevented from being generated when the position of pickup device 15 is changed in the optical axial direction and slope error (that is, plane burr) of pickup surface can be prevented from being generated.

In pickup device driving apparatus 70 according to the embodiment of the present invention, mechanisms for moving pickup device 15 in the optical axial direction, that is, mechanisms including attachment surface 82 which is in contact with base surface 62, first support part 8, movable part 7, second support part 9, attachment surface 85, and leaf springs 10 can be prepared by performing processes including punching and molding on an integral plate material. Accordingly, friction or movement is extremely low and thus driving can be performed with high precision even when slight driving is performed.

Now, linearity characteristics when slight driving is performed will be described in comparison with that of a conventional example. The pickup device driving apparatus for driving pickup device 15 in the optical axial direction using the lead screw, which was described in the related art, will be described as the comparative example. FIG. 6 shows linearity characteristics of pickup device driving apparatus 70 according to the embodiment of the present invention and linearity characteristics of the comparative example.

In FIG. 6, a horizontal axis denotes the number of steps of driving linear actuator 20 and a vertical axis denotes an output value when the position of pickup device 15 is measured by position detecting part 61. When the output value of position detecting part 61 is smoothly changed relative to the number of the steps of driving linear actuator 20, it can be considered that the linearity characteristics are good. In pickup device driving apparatus 70 according to the embodiment of the present invention, whenever linear actuator 20 is driven by one step, pickup device 15 is moved by about 5 μm in the optical axial direction.

In this state, as shown in FIG. 6, it can be seen that the linearity characteristics of pickup device driving apparatus 70 according to the embodiment of the present invention is more improved than that of the pickup device driving apparatus of the comparative example. As described above, this is because the number of members for causing friction or movement, such as the lead screw, is small.

FIG. 6 shows a result of plotting a relationship between the output value of position detecting part 61 provided in pickup device driving apparatus 70 and the number of the steps of driving linear actuator 20. Accordingly, FIG. 6 shows linearity characteristics in the vicinity of the substantial center (original point) of a movable range of pickup device 15 in the optical axial direction (X axis direction). Although not shown, in pickup device driving apparatus 70 according to the embodiment of the present invention, in the whole movable range (for example, the number of the driving steps is about 650 and a movable distance is about 3.3 mm) of pickup device 15 in the optical axial direction (X axis direction), when the movement distance of pickup device 15 in the optical axial direction (X axis direction) with respect to the number of the steps of driving linear actuator 20 is measured, it can be seen that the linearity characteristics are greatly higher than that of the comparative example.

Although, in pickup device driving apparatus 70 of above-described embodiment, base 6 and movable part 7 are supported by a pair of first support part 8 and second support part 9 having columnar shapes, the mechanical strength of first support part 8 is reinforced by first reinforcement plate 16, and the mechanical strength of second support part 9 is reinforced by second reinforcement plate 17, pickup device driving apparatus 70 according to the present invention is not limited to this configuration.

FIG. 7 is a perspective view showing a configuration of pickup device driving apparatus 170 according to another embodiment of the present invention. As shown in FIG. 7, in pickup device driving apparatus 170, first support part 108 is a planar member having a hole at a portion through which light beam is transmitted, not columnar member. First support part 108 has a narrow portion which is in contact with base 6 to configure first plural point 111 (first rotating part 41) and a narrow portion which is in contact with movable part 7 to configure second plural point 112 (third rotating part 43). By this configuration, first reinforcement plate 16 is not required. Bent part 120 is formed at first support part 108 and plane strength of first support part is reinforced. By this configuration, it is possible to suppress plane burr from being generated when pickup device 15 is moved. Instead of first planar support part 108, second planar support part 9 may be used.

In the above-described configuration using first planar support part 108, in order to increase rigidity of first support part 108, various processes may be performed in addition to the bent part 120. FIGS. 8, 9A, 9B, 10A, and 10B show configurations of pickup device driving apparatuses 270, 370, and 470 using first planar support parts 108 according to embodiments of the present invention.

Figure 8:
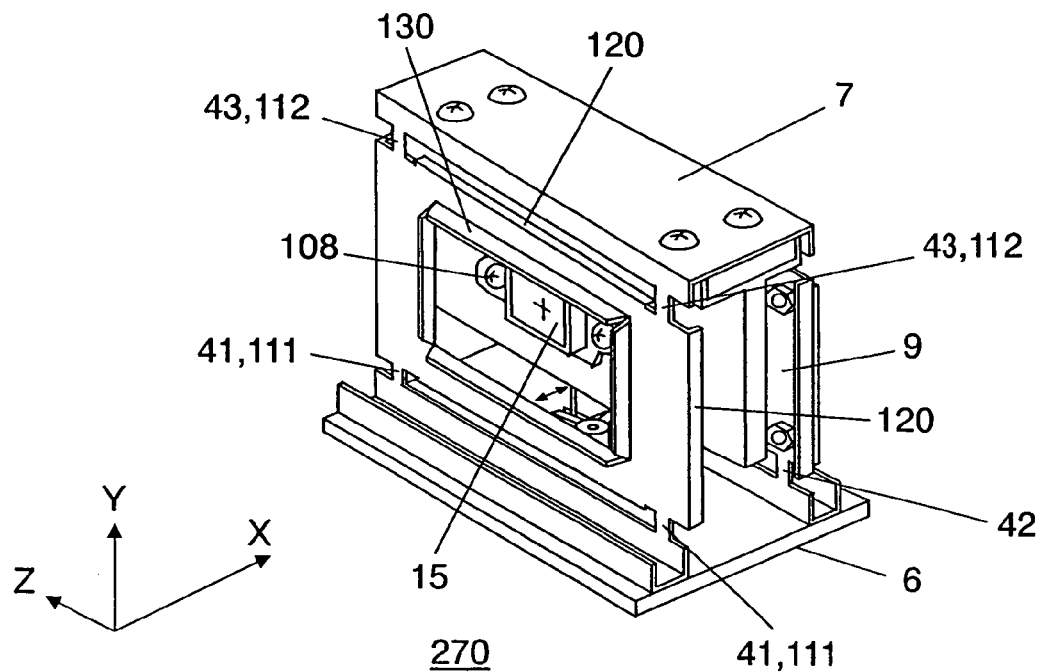
FIG. 8 shows a configuration of a pickup device driving apparatus using a first planar support part according to an embodiment of the present invention.

First, in pickup device driving apparatus 270 shown in FIG. 8, in order to increase rigidity of first planar support part 108, by bending peripheral portions of the hole through which light beam is transmitted to provide bent portions 130, the rigidity of first support part 108 can increase. As shown in FIG. 8, the rigidity can increase, whether bent portions 130 may be bent toward the outside or the inside of pickup device driving apparatus 270.

Figure 9A:
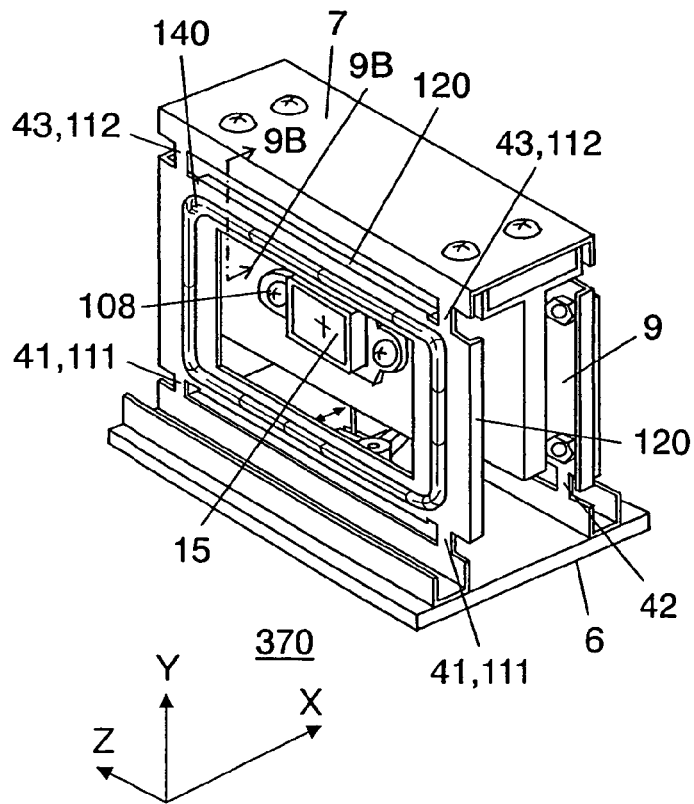
FIG. 9A shows a configuration of a pickup device driving apparatus using a first planar support part according to an embodiment of the present invention.
Figure 9B:
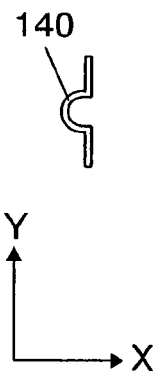
FIG. 9B shows a configuration of a pickup device driving apparatus using a first planar support part according to an embodiment of the present invention.

In pickup device driving apparatus 370 shown in FIG. 9A, in order to increase rigidity of first planar support part 108, by squeezing peripheral portions of the hole through which light beam is transmitted to provide squeezed part 140, the rigidity of first support part 108 can increase. FIG. 9B shows a cross-sectional shape of squeezed part 140 shown in FIG. 9A. As shown in FIG. 9B, squeezed part 140 is squeezed such that the cross section thereof has a substantially circular shape.

Figure 10A:
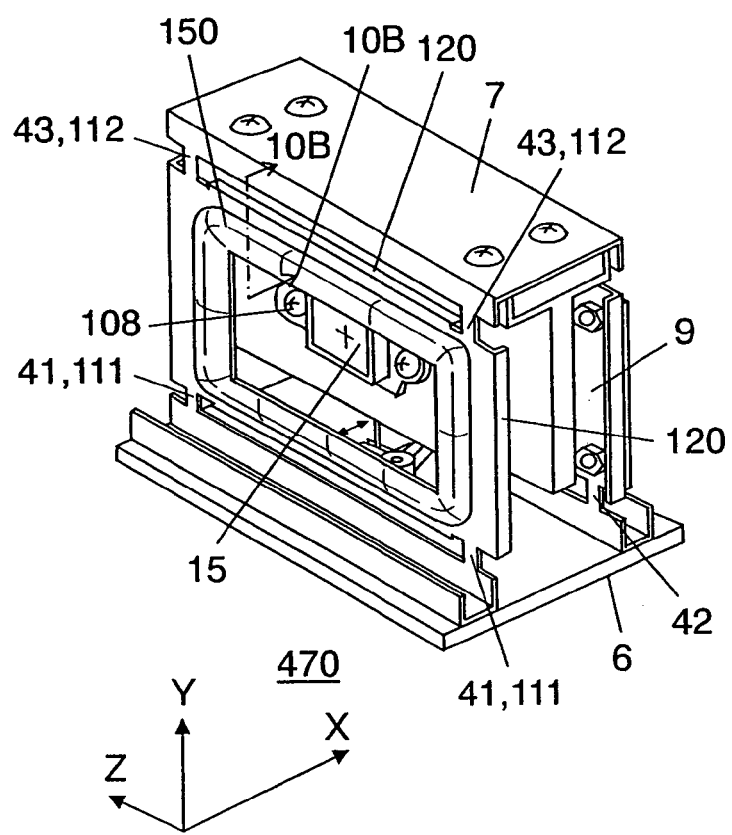
FIG. 10A shows a configuration of a pickup device driving apparatus using a first planar support part according to an embodiment of the present invention.
Figure 10B:
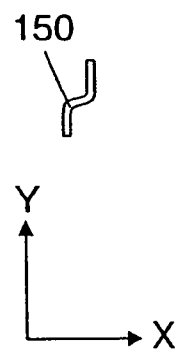
FIG. 10B shows a configuration of a pickup device driving apparatus using a first planar support part according to an embodiment of the present invention.

In pickup device driving apparatus 470 shown in FIG. 10A, in order to increase rigidity of first planar support part 108, by squeezing peripheral portions of the hole through which light beam is transmitted to be protruded such that squeezed part 150 is provided, the rigidity of first support part 108 can increase. FIG. 10B shows a cross-sectional shape of squeezed part 150 shown in FIG. 10A. As shown in FIG. 10B, squeezed part 140 is squeezed such that the peripheral portions of the hole are protruded. The peripheral portions may be protruded toward the outside or the inside of pickup device driving apparatus 470.

In pickup device driving apparatuses 270, 370, and 470 shown in FIG. 8, 9A, 9B, 10A, or 10B, by performing the bending process and the squeezing process, plane strength can increase although a leaf spring which is easily bent is used as a material of first support part 108.

Although, in pickup device driving apparatus 70 according to the embodiment of the present invention, leaf springs 10 are formed between movable part 7 and first support part 8, between movable part 7 and second support part 9, between base surface 62 and first support part 8, and between base surface 62 and second support part 9, the pickup device driving apparatus according to the present invention is not limited to this configuration.

Now, a pickup device driving apparatus according to another embodiment of the present invention will be described.

Figure 11:
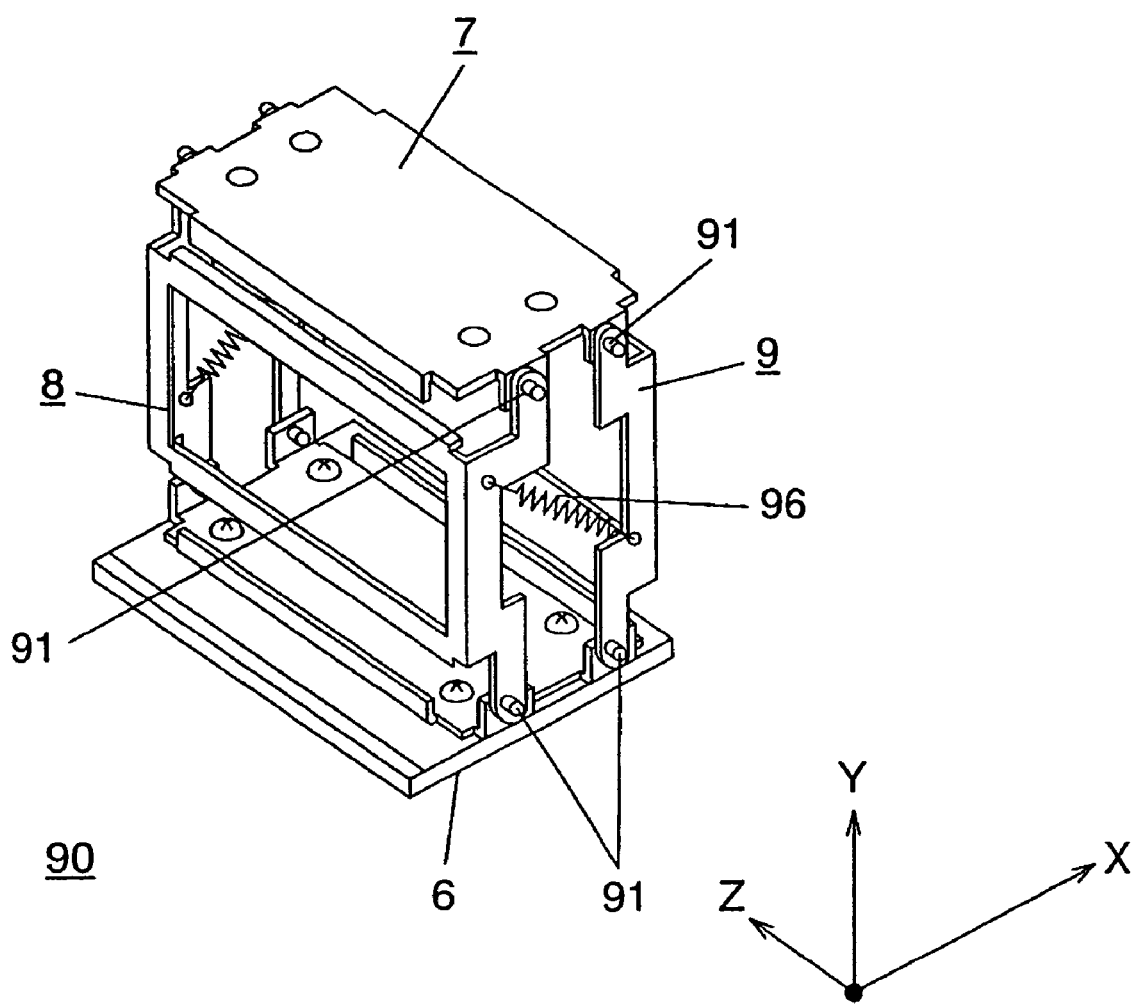
FIG. 11 shows a configuration of a pickup device driving apparatus according to another embodiment of the present invention.
Figure 12A:
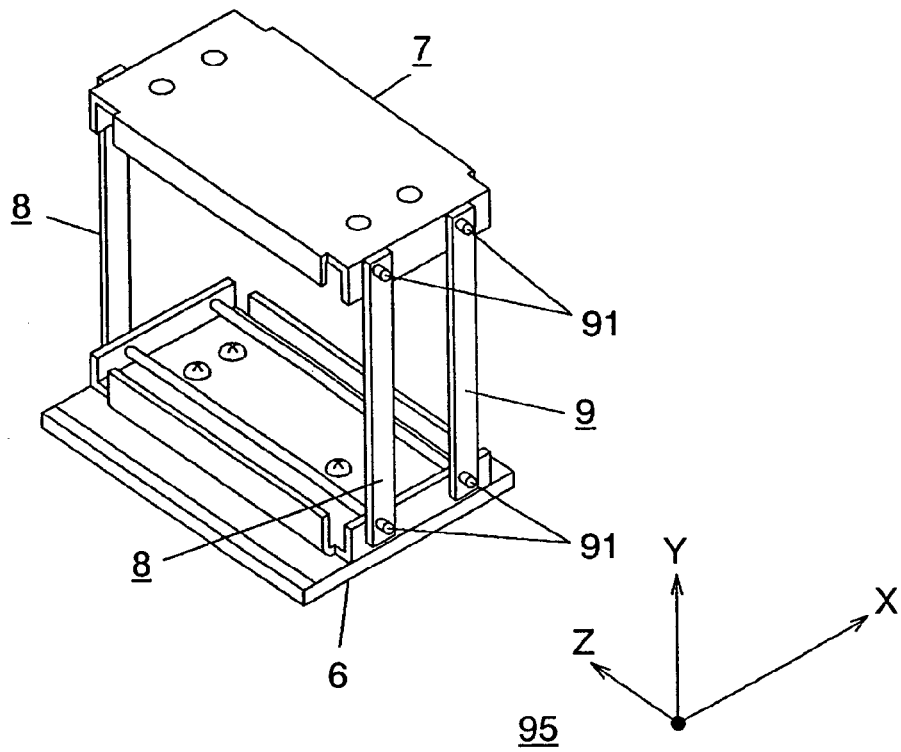
FIG. 12A shows a configuration of a pickup device driving apparatus according to another embodiment of the present invention.
Figure 12B:
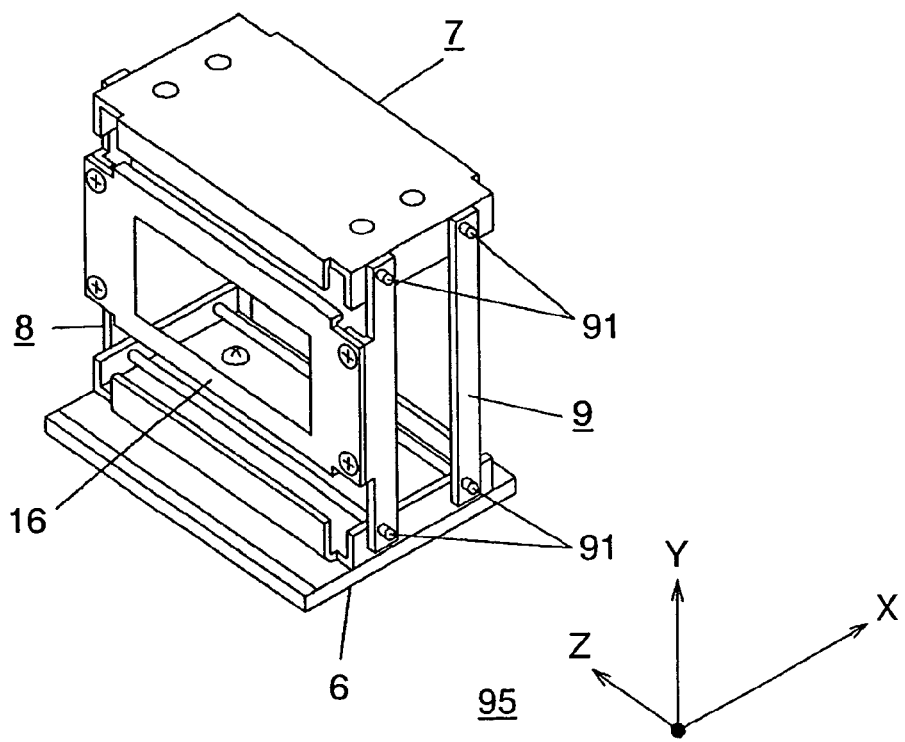
FIG. 12B shows a configuration of a pickup device driving apparatus according to another embodiment of the present invention.

FIG. 11 shows a configuration of a pickup device driving apparatus according to another embodiment of the present invention, and FIGS. 12A to 12B show another embodiment of the present invention.

For example, in pickup device driving apparatus 90 shown in FIG. 11, hinge parts 91 are formed between movable part 7 and first support part 8, between movable part 7 and second support part 9, between base surface 62 and first support part 8, and between base surface 62 and second support part 9. By this configuration, in addition to the above-described effects, it is possible to realize a configuration having more excellent impact resistance. Even in this configuration, as shown in FIG. 11, it is preferable that elastic part 96 such as coil spring for elastically connecting first support part 8 with second support part 9 is disposed in order to suppress hinge parts 91 from being moved.

Although, in this embodiment, hinge parts 91 are formed between movable part 7 and first support part 8, between movable part 7 and second support part 9, between base surface 62 and first support part 8, and between base surface 62 and second support part 9, the pickup device driving apparatus according to the present invention is not limited to this embodiment. For example, leaf springs 10 may be formed at several portions of portions between movable part 7 and first support part 8, between movable part 7 and second support part 9, between base surface 62 and first support part 8, and between base surface 62 and second support part 9, and hinge parts 91 may be formed at the other portions thereof.

Although, in the embodiments of the present embodiment, pickup device driving apparatuses 70 and 90 include a pair of first support parts 8 and a pair of second support parts 9, the pickup device driving apparatus according to the present invention is not limited to this embodiment. For example, like pickup device driving apparatus 95 shown in FIG. 12A or 12B, a pair of first support parts 8 and one second support part 9 may be included or a pair of second support parts 9 and one first support part 8 may be included. Even in this configuration, since a pair of first support part 8 or a pair of second support part 9 is included, rigidity in a direction perpendicular to the optical axial direction can increase.

Although, in pickup device driving apparatus according to the embodiment of the present invention, base surface 62 and movable part 7 are parallel to the optical axial direction and first support part 8 and second support part 9 have the same height and are parallel to each other as shown in FIGS. 5A and 5B, the pickup device driving apparatus according to the present invention is not limited to this configuration.

Figure 13A:
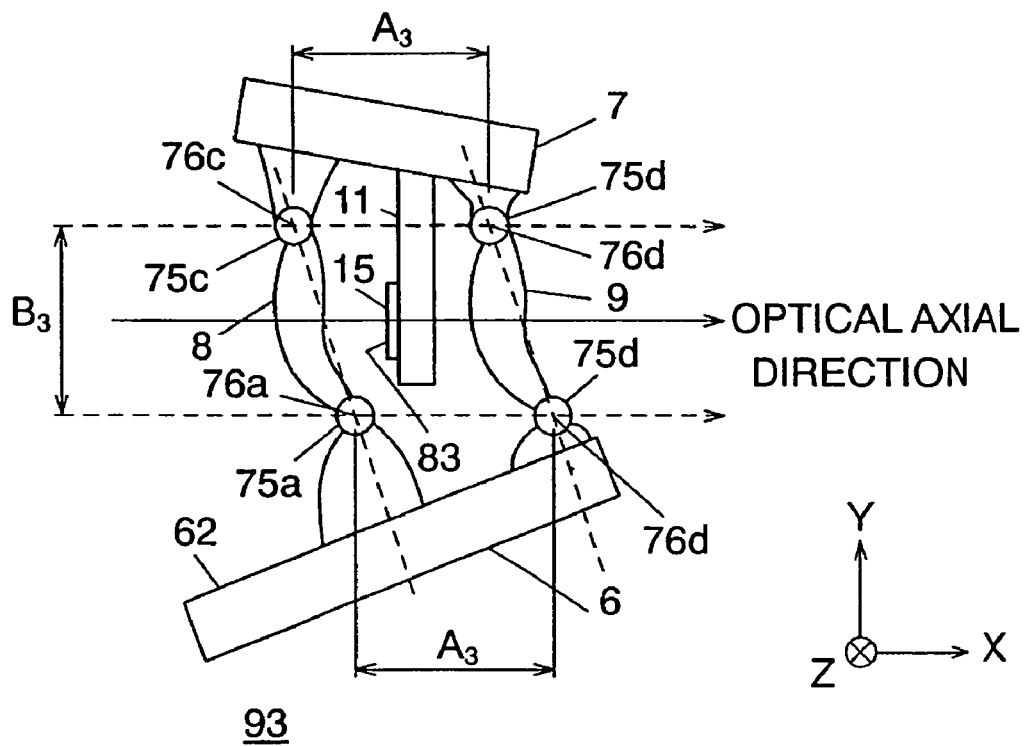
FIG. 13A shows a configuration of a pickup device driving apparatus according to another embodiment of the present invention.
Figure 13B:
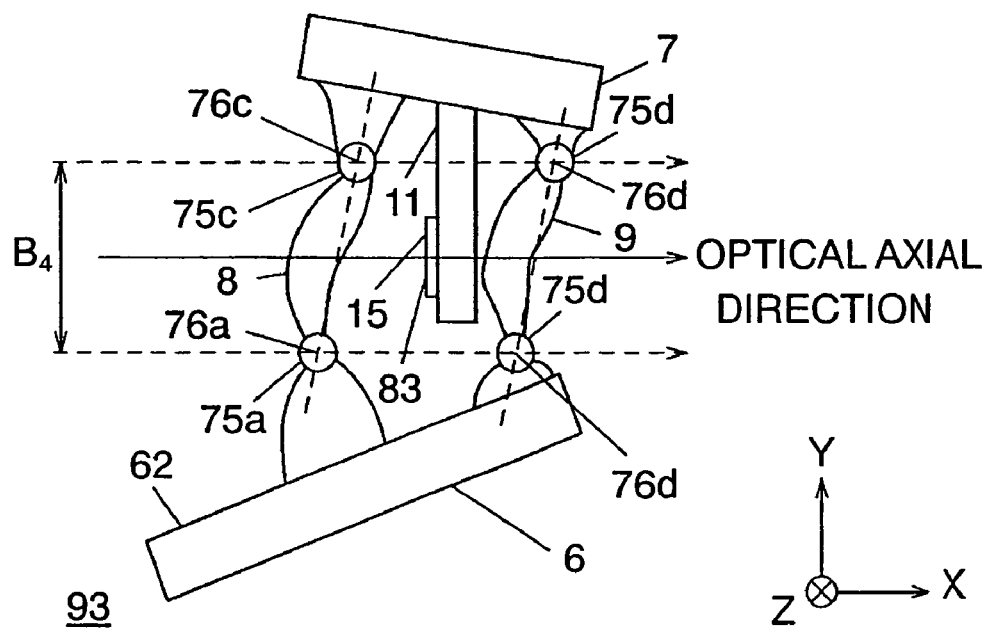
FIG. 13B shows a configuration of a pickup device driving apparatus according to another embodiment of the present invention.

FIGS. 13A and 13B show side views of a pickup device driving apparatus according to another embodiment of the present 70 invention.

Pickup device driving apparatus 93 shown in FIGS. 13A to 13B include base 6 of which the position is fixed with respect to a lens part, movable part 7 provided at a position facing base 6, first support part 8 and second support part 9 which are provided on base surface 62 of base 6 and support movable part 7, and pickup device holding part 11 having first rotating part 75a provided between base 6 and first support part 8, second rotating part 75b provided between base 6 and second support part 9, third rotating part 75c provided between first support part 8 and movable part 7, fourth rotating part 75d provided between second support part 9 and movable part 7, and pickup device 15 provided on movable part 7.

The first rotating part 75a, second rotating part 75b, third rotating part 75c, and fourth rotating part 75d have the same hinge function as above-described hinge parts 91.

In pickup device driving part 93 shown in FIGS. 13A and 13B, movable part 7 and base 6 are not parallel to the optical axial direction of the lens part, and first support part 8 and second support part 9 are not linear, compared with pickup device driving apparatus 70 shown in FIGS. 5A and 5B.

However, in pickup device driving apparatus 93, rotating center axis 76a (hereinafter, referred as to first rotating center axis) of first rotating part 75a, rotating center axis 76b (hereinafter, referred as to second rotating center axis) of second rotating part 75b, rotating center axis 76c (hereinafter, referred as to third rotating center axis) of third rotating part 75c, and rotating center axis 76d (hereinafter, referred as to fourth rotating center axis) of fourth rotating part 75d are parallel to one another and perpendicular to the optical axial direction.

In pickup device driving apparatus 93, as shown in FIG. 13A, first rotating center axis 76a and second rotating center axis 76b are located parallel to the optical axial direction. Similarly, third rotating center axis 76c and fourth rotating center 76d are located parallel to the optical axial direction and separated from each other by the same distance $A_3$ between first rotating center axis 76a and second rotating center axis 76b.

In other words, first rotating center axis 76a, second rotating center axis 76b, third rotating center axis 76c, and fourth rotating center axis 76d are disposed at vertexes of a parallelogram, respectively.

For example, in a state shown in FIG. 13A, first rotating center axis 76a, second rotating center axis 76b, third rotating center axis 76c, and fourth rotating center axis 76d form the vertexes of the parallelogram having a side length of $A_3$ and a height of $B_3$.

FIG. 13B shows a case where movable part 7 or pickup device holding part 11 is moved in a direction that pickup device 15 is separated from the lens part (X axis direction) by driving a driving part (not shown). As shown in FIG. 13B, the height is changed to height $B_3$ to height $B_4$, but pickup device 15 is moved in a state that first rotating center axis 76a, second rotating center axis 76b, third rotating center axis 76c, and fourth rotating center axis 76d are located at vertexes of the parallelogram (in a state that a direction for connecting first rotating center axis 76a to second rotating center part 76b is parallel to a direction for connecting third rotating center axis 76c to fourth rotating center part 76d).

Movable part 7 is moved in the optical axial direction while an angle of the optical axial direction is held and thus pickup device 15 can be moved in the optical axial direction (X axis direction) in a state that the direction of pickup surface 83 is held.

The center position of pickup surface 83 of pickup device 15 is changed depending on the movement of pickup device 15 in the optical axial direction (X axis direction). However, by mounting a displacement amount calculating part for calculating a displacement amount in a direction (Y axis direction) perpendicular to the optical axial direction of pickup device 15 from the position of pickup device 15 in the optical axial direction (X axis direction) detected by position detecting part 61 and a correcting part for shifting a read region of a signal by the displacement amount to correct the displacement amount in circuit part 23 (not shown), it is possible to actually remove influence due to displacement of pickup device 15 in the direction perpendicular to the optical axial direction. When the movement amount of pickup device 15 in the optical axial direction (X axis direction) is small, the above-described correcting process may not actually be performed.

Although, in the embodiment of the present invention, pickup device holding part 11 for holding pickup device 15 is provided at the surface facing base 6 of movable part 7, the present invention is not limited to this configuration. For example, even when pickup device holding part 11 is provided at the surface opposite to the surface facing base 6 of movable part 7 (for example, the upper surface of movable part 7 in FIG. 5A), pickup device 15 can be moved in the optical axial direction in a state that pickup surface 83 of pickup device 15 is held perpendicular to the optical axial direction.

Although examples of mounting the pickup device driving apparatus according to the embodiments of the present invention on the monitoring camera apparatus are described, the use of the photographing apparatus according to the present invention is not limited to the monitoring camera apparatus. For example, the present invention may be mounted on every known camera such as a video camera or a digital camera.

INDUSTRIAL APPLICABILITY

As described above, according to the present invention, a pickup device can be moved in an optical axial direction of a lens part in a state that a pickup surface is held perpendicular to the optical axial direction of the lens part by a simple configuration that the pickup device is attached to a movable part which can be moved on a base surface in the optical axial direction of the lens part. Accordingly, mechanical movement due to the use of a lead screw and a nut can be suppressed from being generated. In addition, even upon slight movement, it is possible to realize a photographing apparatus which can drive a pickup device with high precision. Thus, the present invention is applicable to a photographing apparatus such as a monitoring camera apparatus or a video camera apparatus, and more particularly, to a pickup device driving apparatus for moving a pickup device in an optical axial direction of a lens part and a photographing apparatus using the same.

The invention claimed is:

1. A pickup device driving apparatus comprising:
a base of which the position is fixed with respect to a lens part;
a movable part which is provided to face the base;
a pickup device which is attached to the movable part in a state that a pickup surface is perpendicular to an optical axial direction;
a first support part and a second support part which are provided between the base and the movable part and support the movable part;
a first rotating part which is provided between the base and the first support part;

a second rotating part which is provided between the base and the second support part at a position which is moved from the first rotating part in the optical axial direction in parallel;

a third rotating part which is provided between the movable part and the first support part;

a fourth rotating part which is provided between the movable part and the second support part at a position which forms a vertex of a parallelogram with respect to the first rotating part, the second rotating part, and the third rotating part; and a driving part which changes the position of pickup device relative to the lens part, wherein rotating center axes of the first rotating part, the second rotating part, the third rotating part, and the fourth rotating part are perpendicular to the optical axial direction and parallel to one another, and wherein the position of the pickup device is changed relative to the lens part in a state that the first rotating part, the second rotating part, the third rotating part, and the fourth rotating part form vertexes of the parallelogram.

2. The pickup device driving apparatus of claim 1, wherein the first support part is rotatably connected to the base by a first plural point and rotatably connected to the movable part by a second plural point, and the first plural point and the second plural point form a plane, wherein the second support part is rotatably connected to the movable part and the base, wherein the first rotating part connects the base to the first support part at the first plural point, and wherein the third rotating part connects the movable part to the first support part at the second plural point.

3. The pickup device driving apparatus of claim 2, wherein at least one of the first rotating part, the second rotating part, the third rotating part, and the fourth rotating part is a leaf spring.

4. The pickup device driving apparatus of claim 3, wherein the movable part, the first support part, the second support part, and the leaf spring are integrally formed, and at least one of the movable part, the first support part, and the second support part has a reinforcement part for increasing rigidity.

5. The pickup device driving apparatus of claim 2, wherein the first rotating part, the second rotating part, the third rotating part, and the fourth rotating part are leaf springs.

6. The pickup device driving apparatus of claim 2, wherein at least one of the first rotating part, the second rotating part, the third rotating part, and the fourth rotating part is a hinge part.

7. The pickup device driving apparatus of claim 2, wherein the first rotating part, the second rotating part, the third rotating part, and the fourth rotating part are hinge parts.

8. The pickup device driving apparatus of claim 2, wherein an elastic part is provided between the first support part and the second support part.

9. The pickup device driving apparatus of claim 2, further comprising a pressing part for pressing the movable part in a predetermined direction, wherein the driving part reduces a press force applied to the movable part by the pressing part to drive the movable part.

10. A photographing apparatus comprising:

a lens part;

the pickup device driving apparatus of claim 1; and an image signal processing part which performs an image signal process on a signal output from the pickup device of the pickup device driving apparatus.

11. The photographing apparatus of claim 10, further comprising a displacement amount calculating part which calculates a displacement amount of the pickup device in a direction perpendicular to the optical axial direction; and a correcting part which corrects an image signal processed by the image signal processing part, based on the displacement amount of the pickup device in the direction perpendicular to the optical axial direction calculated by the displacement amount calculating part.

12. A monitoring camera apparatus comprising:

a lens part;

the pickup device driving apparatus of claim 1;

an illumination-intensity change detecting part which detects change in illumination intensity;

a filter part which attaches and detaches an infrared-light cut filter on an optical axis of the lens part depending on the change in illumination intensity detected by the illumination-intensity detecting part; and a control part which drives the driving part of the pickup device driving apparatus when the infrared-light cut filter of the filter part is attached and detached.

* * * * *